Figure 1:
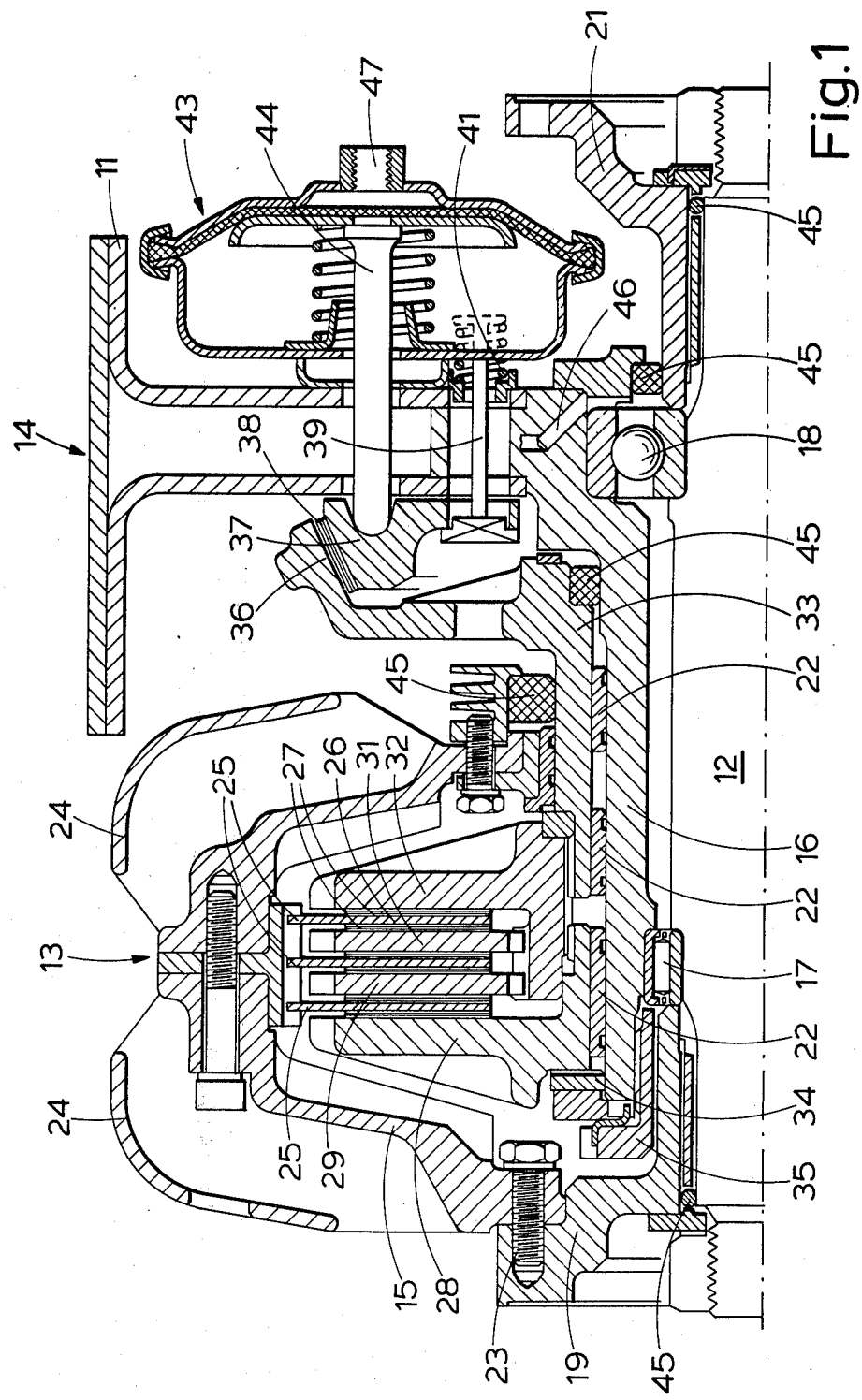

United States Patent [19]

Jarvis et al.

[11] 4,310,080

[45] Jan. 12, 1982

[54] RETARDER FOR ROTATING MEMBERS

[75] Inventors: Roger P. Jarvis, Leamington Spa; David Parsons, Kenilworth, both of England

[73] Assignee: Automotive Products Limited, Warwickshire, England

[21] Appl. No.: 99,567

[22] Filed: Dec. 3, 1979

[30] Foreign Application Priority Data

Dec. 7, 1978 [GB] United Kingdom ............... 47493/78

[51] Int. Cl.³ ............................................. F16D 67/00
[52] U.S. Cl. ...................................... 192/4 B; 192/14; 192/18 A; 188/271
[58] Field of Search .................... 192/4 B, 12 A, 12 C, 192/18 A, 18 R, 58 C, 17 A, 14; 188/271, 290

[56] References Cited

U.S. PATENT DOCUMENTS

| | | | |
|---|---|---|---|
| 3,182,776 | 5/1965 | Sommer | 192/18 A |
| 3,696,898 | 10/1972 | Sommer | 192/18 A |
| 3,872,954 | 3/1975 | Nordstrom et al. | 192/18 A |
| 3,924,715 | 12/1975 | Cory | 192/18 A |

*Primary Examiner*—George H. Krizmanich
*Attorney, Agent, or Firm*—Kemon & Estabrook

[57] ABSTRACT

A ratarder for a power transmission shaft comprises a liquid immersed coupling between the shaft and a drag member, the drag member being normally entrained to rotate with the shaft by viscous drag in the coupling. A dry brake mechanism, having a frictional drag greater than that of the coupling, is provided to restrain the drag member for relative movement to take place in the coupling. In the embodiments shown, the coupling comprises a friction disc pack alternately connected to the shaft and the drag member, the brake mechanism firstly restraining the drag member and subsequently shifting it axially to engage the friction disc pack.

The coupling is suitable for use in heavy motor vehicle transmission systems.

9 Claims, 2 Drawing Figures

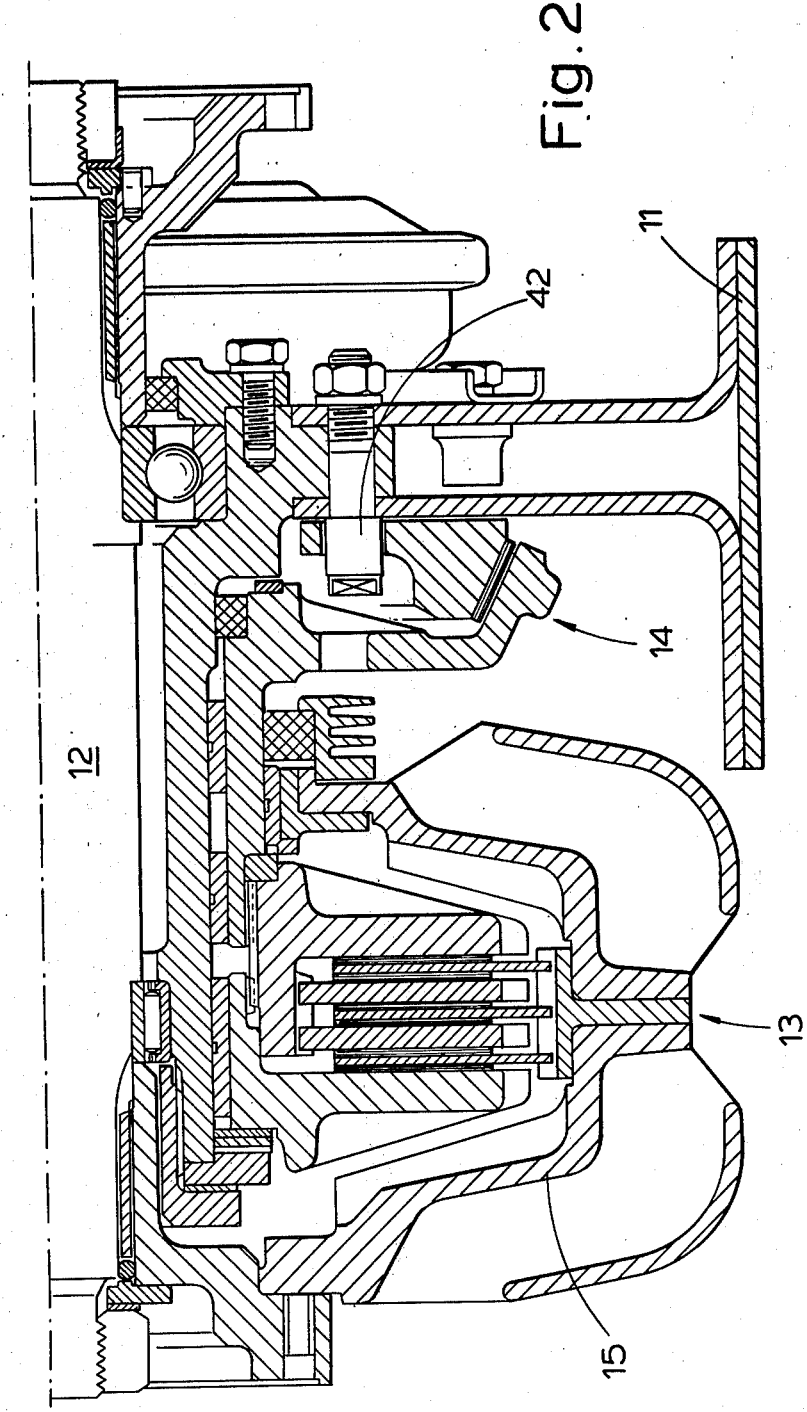

RETARDER FOR ROTATING MEMBERS

The invention relates to improvements in retarders for rotating members.

Retarders comprise a coupling, engageable between a rotating member and a stationary member to progressively retard rotation of the rotating member. Known retarders have hydrodynamic, electrical or frictional couplings and may be liquid immersed to promote efficient dispersion of the energy absorbed as the rotating member is retarded.

A problem with known liquid immersed couplings is the inherent viscous drag between the rotating member and the stationary member whilst the ratarder is unactivated.

For example, one type of retarder, suitable for fitting to motor vehicles, has a liquid immersed frictional coupling comprising a series of interleaved friction disc members co-axial with the rotating member and alternately connected to the rotating member and the stationary member. The retarder is brought into operation by engaging the friction disc members one with another. Such an arrangement is shown in British Pat. No. 1,440,120.

A disadvantage with this type of retarder is that, whilst unactivated, the inherent viscous drag between the alternate stationary and rotating friction disc members results in continuous energy absorption from the rotating member.

It is an object of the present invention to improve the overall efficiency of such retarders by substantially reducing such viscous drag losses.

According to the invention there is provided a retarder for a rotating member, comprising a liquid immersed coupling between the rotating member and a drag mechanism, characterised thereby that the drag mechanism is rotatably mounted so that it can be entrained by the coupling to rotate with the rotating member and a dry brake mechanism is provided in series with the drag mechanism and the coupling, the drag of the dry brake mechanism being greater than the drag of the coupling so that, on application of the dry brake mechanism, the drag mechanism is restrained for relative rotation to take place in the coupling.

Preferably the rotating member, the coupling, the drag mechanism and the dry brake mechanism are co-axial, one with another.

In one embodiment an axially extending portion of the drag mechanism includes an annular braking surface for co-operation with the dry brake mechanism.

Preferably the drag mechanism comprises a substantially cylindrical drag member co-axial about the rotating member.

The coupling may be a friction coupling having interleaved friction disc members alternately connected to the rotating member and the drag member.

Other features of the invention are included in the following description of a preferred embodiment shown, by way of example only, in the accompanying drawing wherein;

FIG. 1 is a vertical sectional view through a retarder of the present invention, the view in the interest of clarity being a respective half about a center line of the retarder; and FIG. 2 is a vertical sectional view being the other half of the retarder shown in FIG. 1.

With reference to the accompanying figures there is shown a relatively fixed mounting frame 11 supporting a power transmission shaft 12. A fluid filled friction coupling, generally indicated at 13, is actuated by a dry brake mechanism, generally indicated at 14.

The coupling comprises an oil filled casing 15 housing a number of interleaved friction plates alternatively connected to the transmission shaft 12 and for connection to the mounting frame 11 through the dry brake mechanism 14. On activation, relative axial movement together of the relatively rotating friction plates slows the shaft 12. The heat so generated is dissipated through the oil to the casing 15 and thence radiated.

The power transmission shaft 12 is supported for rotation in a cylindrical portion 16 of the mounting frame 11 by rolling bearings 17 and 18. End flanges 19 and 21, splined to the shaft 12, provide for respective connection to driving and driven members (not shown).

Plain bearings 22, on the outer periphery of the cylindrical portion 16, support clutching elements of the retarder mechanism for relative rotational and axial movement, as will be subsequently described.

The friction coupling casing 15 is secured to the end flange 19 by bolts 23. Cooling fins 24 are provided on the outer periphery of the casing 15.

Three annular friction discs 25 are splined to the inner periphery of the casing. The discs comprise a backing member 26 having a pair of annular friction facings 27 on opposite sides thereof.

Interleaved with the discs 25, and for engagement therewith, are four plate members splined one to the other for rotation and relative axial movement. The plate members are termed the reaction disc 28, the intermediate discs 29 and 31 and the engagement disc 32. The reaction disc 28 is supported for rotation by one plain bearing 22. An annular drag member 33, supported by other plain bearings 22, is splined to and supports the engagement disc 32.

A thrust bearing 34 transmits loads from the reaction disc 28 through a nut 35 to the mounting frame 11.

The mounting frame 11 supports a dry brake mechanism 14 having interengaging conical friction faces. One engagement face 36 of the brake mechanism is constituted by the outer periphery of an annular axially extending portion of the drag member 33. The other engagement face is formed on an annular brake member 37 by friction facing 38.

The brake member 37 is supported on the mounting frame 11 for limited axial movement and is urged to the rest position by equispaced return pins 39, each pin being acted on by a compression spring box 41 (partially shown). Equispaced reaction pins 42 transfer drag loads from the member 37 to the mounting frame 11.

Three equispaced pressure air actuators 43 are mounted on the frame 11 for engaging the brake mechanism 14, the actuator output rods 44 engaging with the back face of the brake member 37.

The actuator inlet ports 47 are connected to a retarder control valve and air pressure supply (not shown).

Seals 45 retain the working fluid in the friction coupling casing 15. A fluid duct 46, in the mounting frame, is connected to a remotely mounted reservoir (not shown) to ensure that the coupling fluid level remains constant.

The friction materials and contact areas of the retarder are chosen such that, on engagement, the frictional drag of the brake mechanism is greater than the drag of the friction coupling.

Operation of the retarder is as follows:

The transmission shaft 12, casing 15 and friction discs 25 are rotating, the brake mechanism 14 is released and the brake member 37 withdrawn against the mounting frame 11. The plate members 28, 29, 31 and 32 and drag member 33 will be rotating with the transmission shaft 12 due to viscous forces in the friction coupling 13.

On engagement of the brake mechanism 14 by the air actuators 43, the drag member 33 and plate members 28, 29, 31 and 32 will be brought to a halt. Further travel of the actuator output rods 44 will urge the elements of the friction coupling into engagement, the reaction load being taken through thrust washer 34 as previously described.

Since the drag of the brake mechanism 14 is greater than that of the friction coupling 13 the friction discs 25 will rotate between the, now stationary, plate members 28, 29, 31 and 32.

The transmission shaft 12 will be retarded and heat generated will be dissipated into the coupling oil and radiated from the casing cooling fins 24.

On release of the brake mechanism 14, the brake member 37 is positively withdrawn by the return pins 39 allowing the plate members 28, 29, 31 and 32 and drag member 33 to rotate with the casing 15.

The viscous drag of the inactivated coupling 13 is reduced since the plate members 28, 29, 31 and 32 can rotate freely with the casing 15, relative movement taking place primarily between the engagement faces of the brake mechanism 14. The frictional drag from the fluid seals 45 will be small when compared with the viscous drag of prior art retarders.

The number and size of interleaving friction discs and plate members may be varied to suit any required shaft retardation duty, the capacity of the brake mechanism being varied accordingly.

Many other types of brake mechanism could be suitable for this application, so long as the requirement of frictional drag is met.

Although the retarder has been described with the fluid filled friction coupling interposed between the transmissions shaft and the brake mechanism, a retarder having the brake mechanism interposed between the transmission shaft and the coupling may be advantageous under certain conditions of intended use.

We claim:

1. A rotation retarding mechanism comprising:
   a rotational member;
   rotational drag means;
   a liquid immersed coupling comprising relatively rotatable input and output elements, the input element being connected to said rotational member and the output element being connected to said rotational drag means;
   and dry brake means for holding the drag means against rotation, the drag value of the dry means being greater than the drag value of the coupling so that on application of the dry brake means the drag means is restrained and relative rotation can take place between the relatively rotatable elements in the coupling.

2. A rotation retarding mechanism according to claim 1, wherein the rotational member, the liquid immersed coupling, the drag means and the dry brake means are co-axial, one with another.

3. A rotation retarding mechanism according to claim 2, wherein the drag means comprises a substantially cylindrical drag member co-axial about the rotational member.

4. A rotation retarding mechanism according to claim 3, wherein the drag member includes an axially extending portion having an annular braking surface comprising part of the dry brake means.

5. A rotation retarding mechanism according to claim 2, wherein the liquid immersed coupling further comprises a friction coupling having interleaved friction disc members alternately connected to the rotational member and to the drag means, said friction disc members being for rubbing contact, one with another, on application of the dry brake means.

6. A rotation retarding mechanism according to claim 5, wherein the drag means comprises a substantially cylindrical drag member co-axial about the rotational member and mounted for axial movement relative to the friction coupling for engagement of the friction disc members.

7. A rotation retarding mechanism according to claim 6, wherein a reaction path for the braking force generated by the dry brake means is provided through the drag member and the friction coupling.

8. A rotation retarding mechanism according to claim 7, wherein the drag member includes a generally axially extending portion having an annular braking surface comprising part of the dry brake means.

9. A rotation retarding mechanism according to claim 8, wherein the dry brake means is a cone brake.

* * * * *